(12) United States Patent
Andalibian

(10) Patent No.: US 11,027,987 B1
(45) Date of Patent: Jun. 8, 2021

(54) BALLAST WATER, BILGE WATER, SLOP WATER, OR OILY WATER TREATMENT SYSTEM

(71) Applicant: Andy Andalibian, Monarch Beach, CA (US)

(72) Inventor: Andy Andalibian, Monarch Beach, CA (US)

(*) Notice: Subject to any disclaimer, the term of this patent is extended or adjusted under 35 U.S.C. 154(b) by 0 days.

(21) Appl. No.: 16/689,992

(22) Filed: Nov. 20, 2019

(51) Int. Cl.
| | | |
|---|---|---|
| *C02F 1/40* | (2006.01) | |
| *C02F 9/00* | (2006.01) | |
| *C02F 1/52* | (2006.01) | |
| *C02F 1/32* | (2006.01) | |
| *C02F 1/00* | (2006.01) | |
| *C02F 103/00* | (2006.01) | |

(52) U.S. Cl.
CPC .............. *C02F 1/40* (2013.01); *C02F 1/001* (2013.01); *C02F 1/006* (2013.01); *C02F 1/32* (2013.01); *C02F 1/5236* (2013.01); *C02F 9/005* (2013.01); *C02F 2001/007* (2013.01); *C02F 2103/008* (2013.01); *C02F 2201/007* (2013.01); *C02F 2303/06* (2013.01)

(58) Field of Classification Search
None
See application file for complete search history.

(56) References Cited

U.S. PATENT DOCUMENTS

| | | | |
|---|---|---|---|
| 777,622 A | 12/1904 | Frost | |
| 3,965,004 A * | 6/1976 | Garber | B01D 17/02 210/691 |
| 4,038,184 A | 7/1977 | Svanteson | |
| 4,497,918 A * | 2/1985 | Wason | C08K 3/36 523/207 |
| 5,374,356 A | 12/1994 | Miller | |
| 5,767,060 A | 6/1998 | Hanrahan | |
| 5,932,091 A | 8/1999 | Tompkins | |
| 5,932,112 A | 8/1999 | Browning | |
| 6,056,881 A | 5/2000 | Miller | |
| 6,361,695 B1 | 3/2002 | Husain | |
| 6,613,232 B2 | 9/2003 | Chesner | |
| 6,652,750 B1 | 11/2003 | Pica | |
| 7,153,423 B2 | 12/2006 | Gordon | |
| 7,297,267 B2 | 11/2007 | Denton | |
| 2004/0060876 A1 * | 4/2004 | Tipton | B63J 4/002 210/748.16 |
| 2004/0079706 A1 | 4/2004 | Mairal | |
| 2004/0099607 A1 * | 5/2004 | Leffler | C02F 1/4672 210/704 |
| 2008/0277354 A1 * | 11/2008 | Baerheim | B63J 4/002 210/750 |
| 2008/0283467 A1 | 11/2008 | Nguyen | |
| 2009/0211507 A1 | 8/2009 | Fielding | |
| 2011/0226681 A1 | 9/2011 | Lee | |

(Continued)

*Primary Examiner* — Clare M Perrin
(74) *Attorney, Agent, or Firm* — Buche & Associates, P.C.; John K. Buche; Bryce A. Johnson

(57) ABSTRACT

Disclosed are remote oily water treatment systems, including systems and related methods of remote oily water treatment with point-of-treatment discharge of treated water. In a preferred embodiment, (a) oily water is treated at a location proximate to where the oily water by passing the oily water through a tank containing a medium defined by at least one polymer mixed with activated carbon and (b) treated water is discharged at the point-of-treatment of the oily water.

7 Claims, 11 Drawing Sheets

(56) References Cited

U.S. PATENT DOCUMENTS

2012/0125854 A1* 5/2012 Holtslander ............ C02F 1/285
  210/660
2013/0313191 A1   11/2013 Wolf
2015/0232164 A1    8/2015 Tange
2016/0367912 A1* 12/2016 Kennedy ............ B01D 17/0214

* cited by examiner

BALLAST WATER, BILGE WATER, SLOP WATER, OR OILY WATER TREATMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of remote oily water treatment systems, including systems and related methods of remote oily water treatment with point-of-treatment discharge of treated water.

Background of the Invention

Oily waters, i.e., oils mixed or otherwise intermingled with waters, represent a general category of pollutant inherent to any industrialized economies that are energized by fossil fuels. Oily waters are typically the result of either (a) spills of oil reserves (e.g., oil spilled during transport or storage of oil products) or (b) oil leaks from running machinery (e.g., during operation of oil using generators, air compressors, or engines). Oily waters can also contain other non-oil contaminants like dissolved solids and biological species. Oily waters are environmentally destructive and therefore, the handling and disposal of such waste by its creators is heavily regulated by national (i.e., local) and international (i.e., regional or global) laws.

Typically, creators of oily waters are obligated by law to clean their oily waters to an acceptable water purity. Acceptably pure water may be legally discharged to the environment while the removed oil and other contaminants must be appropriately recycled, discarded, or destroyed. Violation of laws that govern the discharge of treated water can be severely punished, usually by hefty monetary fines. Treating oily water is expensive, but the punishments/fines imposed for failing to treat oily water outweigh the costs of treatment. Thus, a need exists for economical water treatment systems capable of cleaning oily waters to an acceptable water purity so that the treated water can be discharged to the environment while the oil and other contaminants are recycled, discarded, or destroyed.

Processes for treating oily water now exist. However, several complications can arise with regard to the treatment of oily waters. For instance, oily waters are known to be remotely created on land, at inland waterways (lakes and streams), or at sea so that the oily-water must be either (a) collected and transported from the remote location to a land-based treatment facility for water purification or (b) collected and treated by a portable treatment facility that has been delivered to the locale of the oily water. Collection and subsequent transport of oily water to a treatment facility is particularly problematic because the practice is expensive, is time consuming, requires cargo routes to-and-from the remotely created waste, requires a large footprint for the full-scale treatment facility, and involves subjecting the oily water waste to the jurisdiction of several regulatory agencies that do not have identical regulations. Delivery of a treatment facility to remotely created oily waters is also a problematic practice because known portable treatment facilities do not have the efficacy or capacity of full-scale water treatment sites and water purity standards for discharged water are usually more stringent at the remote location than for discharge locations of full-scale water treatment sites. In view of the foregoing, a need exists for oily water treatment systems that are (a) deliverable to remote locations, (b) have the efficacy and capacity of full-scale treatment sites, and (c) are capable of attaining water purity for acceptable point-of-treatment discharge of treated water.

DESCRIPTION OF THE RELATED ART

FIG. 1 is a process flow diagram for the typical cleanup of oily waters generated on land at accessible locations. First, oily water is generated, e.g., by leaking machinery. Second, a hazmat waste transporter collects the oily water and transports the waste to a full-scale land-based treatment facility. Third, the waste is treated by the full-scale land-based treatment facility and discharged to the land-sewer. Fourth, publically owned treatment works collect and treat the influent. Finally, the treated effluent is discharged to the ocean.

FIG. 2 is a process flow diagram for the typical cleanup of oily waters generated on land at inland waterways (e.g., lakes, streams, wetlands) or other inaccessible locations. First, oily water is generated, e.g., by oil spill. Second, a spill response team assesses whether the waste can be accessed and IF not the waste is not cleaned or ELSE roads or other pathways are built to the oily water. It is important to note that IF a road or pathway cannot be built, THEN the oily water would not get cleaned up. Third, a hazmat waste transporter collects the oily water, e.g., via a plurality of trucks, and transports the waste to a full-scale land-based treatment facility. Fourth, the waste is treated by the full-scale land-based treatment facility and discharged to the land-sewer. Fifth, publically owned treatment works collect and treat the oily water. Finally, the treated effluent is discharged to the ocean.

FIG. 3 is a process flow diagram for the typical cleanup of oily waters generated at sea or open ocean. First, oily water is generated, e.g., by oil spill from a ship, pipeline or platform. Second, a spill response team collects the oily water onto the storage tanks of a barge or vessel. Third, the barge or vessel is returned to port. Fourth, a hazmat waste transporter collects the oily water, e.g., via a plurality of trucks, and transports the waste to a full-scale land-based treatment facility. Fifth, the waste is treated by the full-scale land-based treatment facility and discharged to the land-sewer. Sixth, publically owned treatment works collect and treat the oily water. Finally, the treated effluent is discharged to the ocean.

FIG. 4 is a process flow diagram for the typical cleanup of oily waters generated at sea or open ocean. First, oily water is generated, e.g., by leaking machinery on board a vessel service (e.g., bilge water, slop water ("slops"), ballast water, gray water, FOG water (fats, oils, greases). Second, EITHER a spill response team collects the oily water from the generating vessel and loads the same onto the storage tanks of a second barge or vessel OR the oily water is collected and stored on board the waste generating vessel. Third, the barge or vessel containing the waste is returned to port. Fourth, a hazmat waste transporter collects the oily water, e.g., via a plurality of trucks, and transports the waste to a full-scale land-based treatment facility. Fifth, the waste is treated by the full-scale land-based treatment facility and discharged to the land-sewer. Sixth, publically owned treatment works collect and treat the oily water. Finally, the treated effluent is discharged to the ocean.

U.S. Pat. No. 5,767,060 (issued Jun. 16, 1998) by Hanrahan discloses "a bonded polymer filter medium and its use." The "bonded multi-component filter system preferably contains at least two active components, namely, activated carbon adsorbent and a blend of at least two organic polymer absorbents." Abstract.

U.S. Pat. No. 5,932,091 (issued Aug. 3, 1999) by the U.S. Navy discloses an "oily waste water treatment system." This system operates aboard a waste generating ship or vessel for small-scale and onboard treatment of any onboard generated oily water. In the system, the effluent outflow from a shipboard oil/water separator is further reduced in oil content by passage through ultrafiltration membranes arranged in series as an added downstream treatment prior to overboard discharge. See abstract. The system involves back flushing with potable water and the heating of the water.

U.S. Pat. No. 6,613,232 (issued Sep. 2, 2003) by Chesner and Melrose discloses a "mobile floating water treatment vessel." The "floating mobile self-contained membrane filtration treatment vessel" is "suitable for use in the treatment of contaminated marine waters and shipboard wastes, including, but not limited to, ballast water, gray water, and black water and excess dredge waters." Abstract. The mobile treatment vessel preferably includes a micro or ultrafiltration membrane treatment system for micron and submicron sized particulate removal. Id.

U.S. Pat. No. 7,297,267 (issued Nov. 20, 2007) by Denton et al. discloses an "oil-sorbing filter element." This is a small-scale "oil-sorbing filter element for removing oil from an aqueous flow such as the bilge water of a water craft." Abstract. "The element includes a first stage which is formed of a consolidated permeable mass of oleophilic polymeric material such as styrenic mid-block co-polymer." Id.

SUMMARY OF THE INVENTION

In view of the foregoing, an object of this specification is to disclose remote oily water treatment systems, including systems and related methods of remote oily water treatment with point-of-treatment discharge of treated water. It is a further objective to disclose oily water treatment systems that comply with applicable water purity standards so that penalties and fines to oily water generating entities are reduced. It is further an objective of this disclosure to disclose oily water treatment facilities that have a small footprint and that do not damage the environment during oily water cleanup. It is yet another objective of this disclosure to illustrate water treatment systems that reduce the hazardous waste generated during water treatment. Yet still, it is an objective of this disclosure to describe water treatment systems that reduce manpower and cleanup time relative to known water treatment systems. Another objective is to disclose systems for treating oily water that work in both salt and fresh water environments without the need to have the oily water hauled off-site.

In one embodiment, the water treatment process involves: (a) collecting the oily water in a storage tank; (b) separating the oil from the water via an oil-water separator or by a settling tank; (c) passing (i) the separated water through a bag filter to remove large solid waste and debris and (ii) the oil to a holding tank; (d) passing the bag filtered water through a sand filter to remove small solid waste and debris; (e) passing the sand filtered water through flocculation to promote agglomeration and settling of particulate wastes; (f) pass the flocculated water into a settling tank; (g) separating the water from the agglomerated and settled particulate wastes; (h) passing (i) the water through media tanks for cleansing the water to a particular purity and (ii) the agglomerated and settled particulate wastes to a filter press; (j) passing the cleansed water through an ultraviolet light treatment to purge or otherwise address any biological materials in the water; (l) placing the purged (or otherwise addressed) water in holding tanks; and (k) discharging the water on-location where the oily water was generated or collected. Suitably, the media tanks are coated steel tanks (e.g., polyester coated steel tanks) filled with a polymer bond media mixture comprising at least one polymer mixed with activated carbon. In a preferred embodiment, the media tank optionally features a connection to an air compressor to lift and/or circulate the polymer bond media mixture within the tank.

In one embodiment, the storage tank, oil-water separator, bag filter, holding tank, sand filter, flocculation tank, settling tank, media tanks, filter press, ultraviolet light treatment, and holding tanks define a kit that may be assembled on-location. In another embodiment, said components are assembled on a ship or other vessel. In yet another embodiment, said components are assembled in a shipping container. In yet another embodiment, the components are assembled in a truck trailer. In yet still another embodiment, the components are assembled in a portable container that is deliverable via helicopter or drone. In a typical mode of operation, a treatment system is delivered to a location where oily water is generated or collected, the oily water is passed through the delivered system, and the water effluent is discharged on-location.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which.

Figure 1:
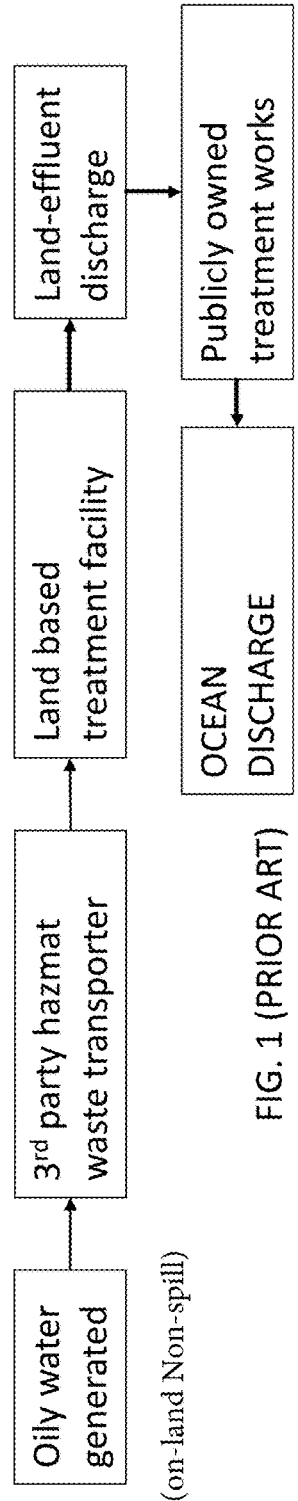
FIG. 1 is a process flow diagram for the typical cleanup of oily waters generated on land at accessible locations.

In the drawings, the follow numerals make the below corresponding designations:
ship or vessel 1000;
bag or screen filter 1100;
primary storage tank 1150;
oil storage tank 1250;
water tank 1200;
primary treatment tanks 1300;
filter press 1320;
storage tank 1350;
bin 1400;
sand filter 1450;
diatomaceous earth (DE) filter 1500;
media tank 1550;
UV system 1600; and,
storage tank 1650.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed are remote oily water treatment systems, including systems and related methods of remote oily water treatment with point-of-treatment discharge of treated water. In a preferred embodiment, (a) oily water is treated at a location proximate to where the oily water by passing the oily water through a tank containing a medium defined by at least one polymer mixed with activated carbon and (b) treated water is discharged at the point-of-treatment of the oily water. The more specific details of the system are disclosed in connection with FIGS. 5A through 10.

Figure 5A:
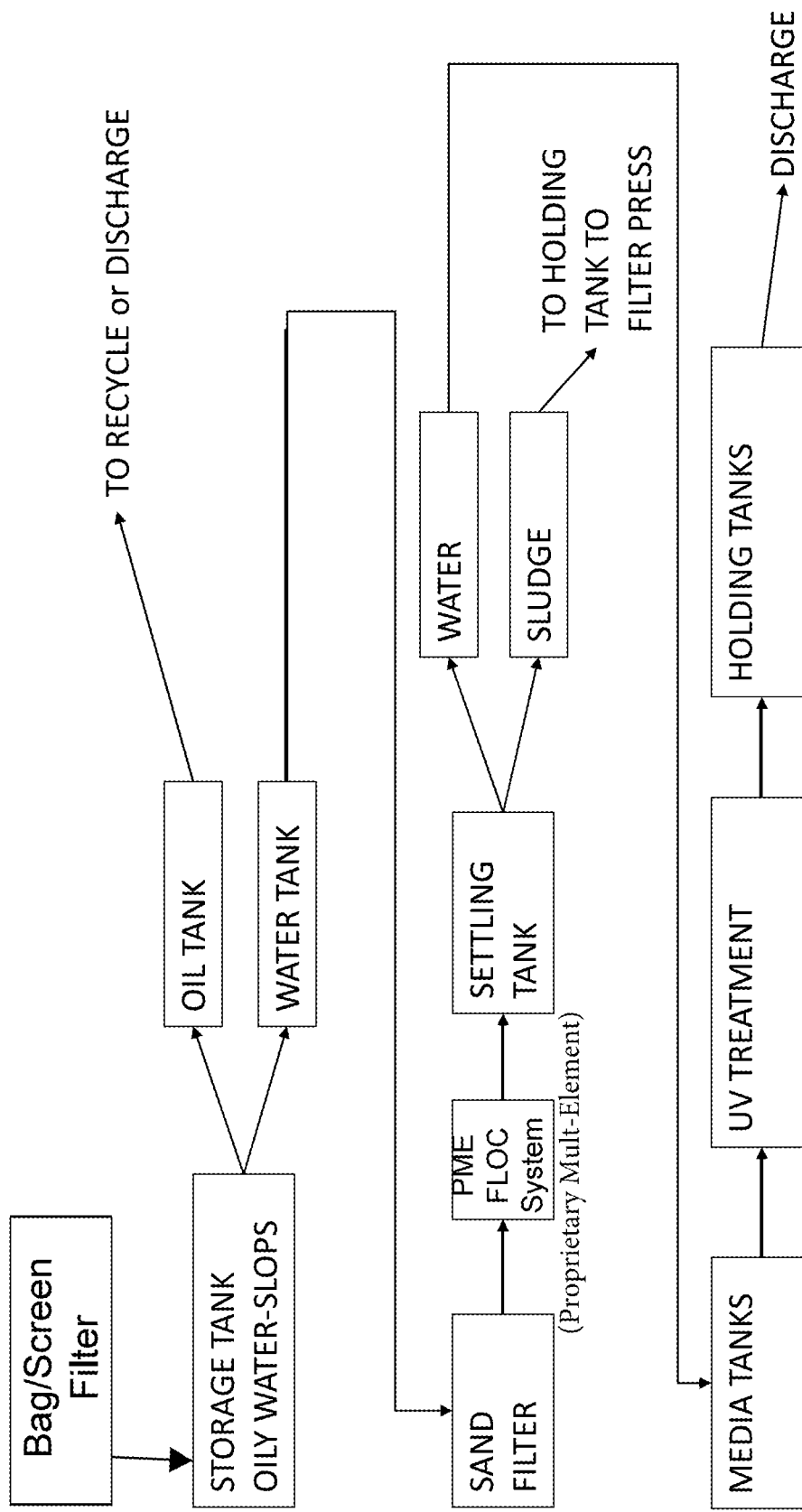
FIG. 5A is a preferred embodiment of the disclosed system of oily water treatment.

FIG. 5A is a general process diagram for treating oily water according to the disclosed system. As shown, oily water slops may be placed collected and passed through a bag filter to remove large solid waste and debris. Next, bag filtered water may be forwarded to a storage tank so that the oil and water may separate into layers. Suitably, emulsified oily water slops may be passed through an oil and water separator. In a preferred embodiment, an oil separation tank is employed when oily water contains high enough concentration of oil to be recovered and recycled. A preferred size of tank is a three to five thousand gallon collapsible tank that is designed to be self-supporting without framework. In other embodiments, a larger metal "baker tank" can be used. Preferably, the oil layer or oil from the separator may be recycled, destroyed, or otherwise discarded. In one instance, the oil can be provided to three hundred and thirty gallon totes for removal from the treatment site. Typically, the water layer or water from the oil water separator may still contain oil and must be further treated. Suitably, said water layer may be passed through a sand filter to remove small solid waste and debris. In one embodiment, pool type sand filters can be employed, including #18 playground sand, crushed walnut shell, and the like. In a preferred embodiment, sand is provided to the filters on-location. After sand filtration, the water may be flocculated to promote agglomeration and settling of particulate wastes. Suitably, flocculated water may be placed into a settling tank so that the water may be separated from the agglomerated and settled particulate wastes. In a preferred process, the agglomerated and settled particulate wastes are passed through a filter press while the cleansed water is passed through media tanks for cleansing the water of any remaining oil to a particular purity. Optionally, the purified water may be purged of biological materials via ultraviolet light treatment. Ultimately, the treated water is discharged to the environment at the location or point of treatment. Suitably, the system uses a preferred filtration system that is superior to Carbon based filters. The preferred filtration system can separate emulsified oil from water and can also absorb free product (free product represents contaminants that are separate from the water to be treated rather than contaminants in solution with the water to be treated; free product is usually a measurable and easily removable quantity of oil).

One important step in the above described processes is the passing of water through media tanks for removing of oil to a particular water purity. In a preferred embodiment, the media is stored in a polyester coated steel tank coupled to an air compressor that passes air through the tank with a result that the media does not stagnate. In a preferred embodiment, the outflow from the tank is closed while air is passed into the tank. In one embodiment, the media is a bonded polymer filter medium comprising a mixture of at least one polymer and activated carbon. Several possible options for suitable media are disclosed by U.S. Pat. No. 5,767,060 (issued Jun. 16, 1998) by Hanrahan. The Hanrahan patent is hereby incorporated by reference in its entirety.

In one embodiment, the storage tank, oil-water separator, bag filter, holding tank, sand filter, flocculation tank, settling tank, media tanks, filter press, ultraviolet light treatment, and holding tanks define a kit that may be assembled on-location. Each component in the kit may be suitably transferable in its own right for assembly of the system at the remote location. Components may variously feature fork lift holds and harness holds for movement of the components. In another embodiment, said components are assembled on a ship or other vessel. See FIG. 5B. In yet another embodiment, said components are assembled in a shipping container and positioned on a boat. In yet another embodiment, the components are assembled in a truck trailer. For instance, the system may be built-into or assembled on one or more single drop flatbed semi-trailer and/or any type trailer. In particular, the media tanks may be transported on a single trailer, although a second trailer could be necessary to collect and haul spent media due to weight increases. Details of media tanks that would be appropriate size for such trailer are disclosed in connection with FIG. 5B. In yet still another embodiment, the components are assembled in a portable container that is deliverable via helicopter or drone. In some embodiment, components of the system feature hooks or latches that can be rigged with the harness of a drone or helicopter for remote delivery. Details of media tanks that would be appropriate size for such trailer are disclosed in connection with FIG. 5B. In a typical mode of operation, a treatment system is delivered to a location where oily water is generated, the oily water is passed through the delivered system, and the water effluent is discharged on-location.

Figure 5B:
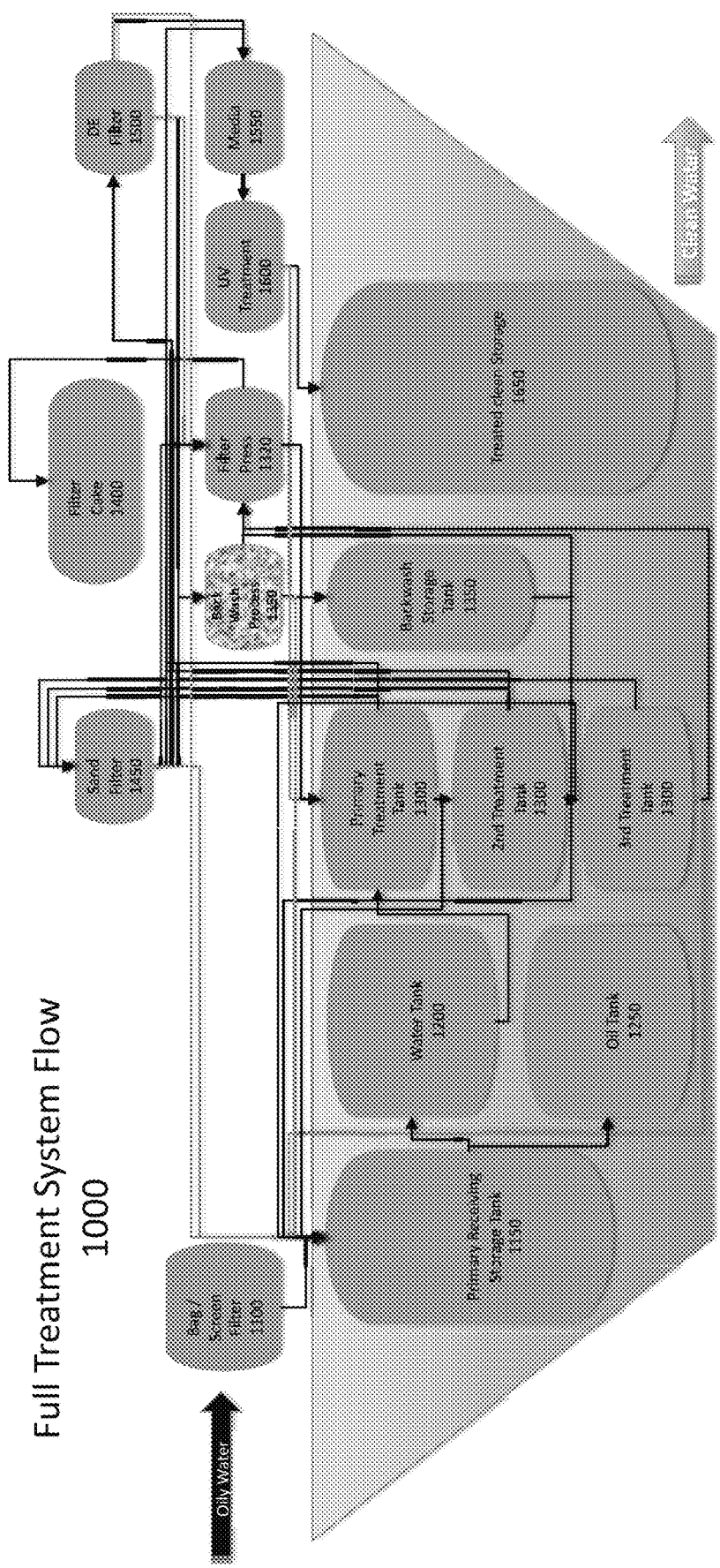
FIG. 5B is another preferred embodiment of the disclosed system of oily water treatment where the system is assembled on a ship or vessel.
Figure 5B:
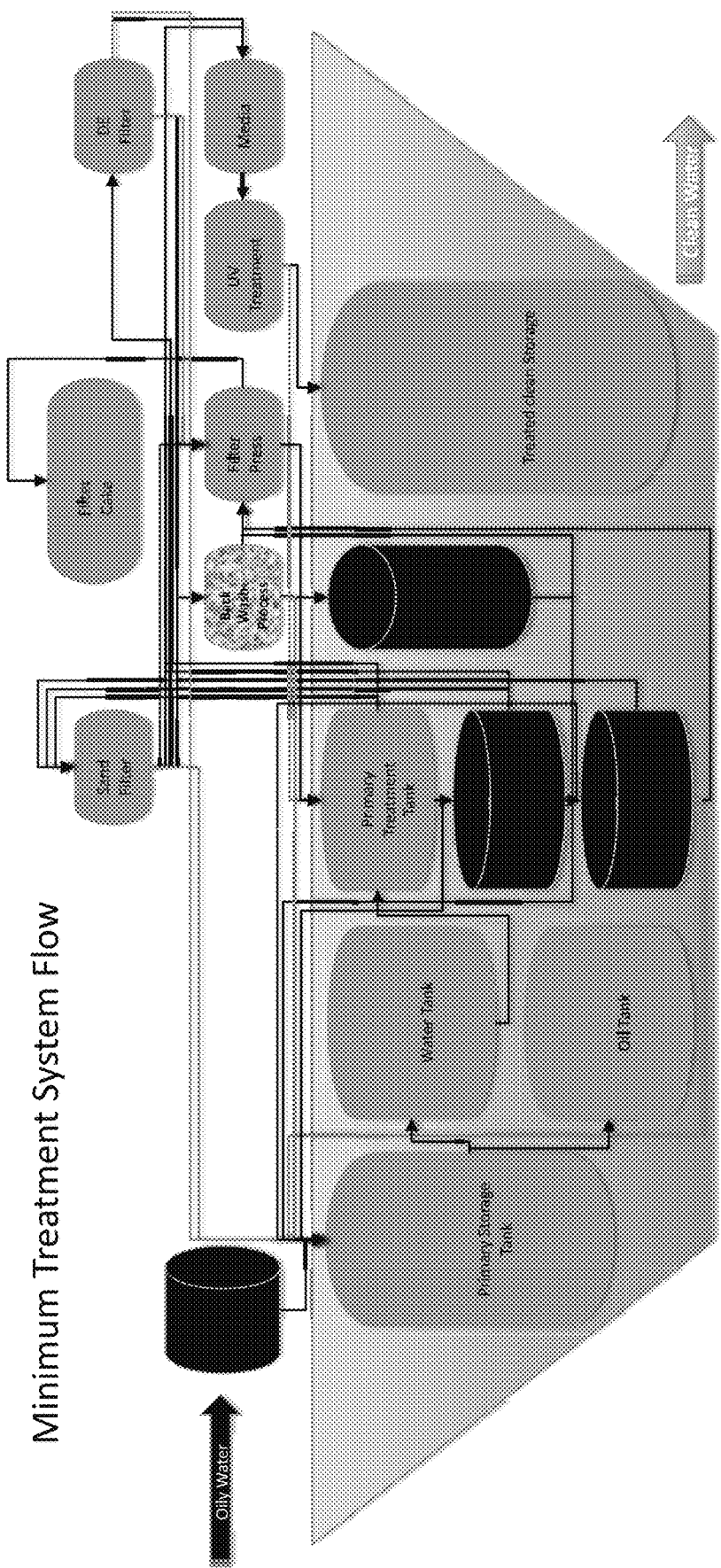

In one embodiment, the system may be assembled on a ship, vessel or barge for ballast and bilge, slops, and/or oily water treatment. FIG. 5B is another preferred embodiment of the disclosed system of oily water treatment where the system is assembled on a ship or vessel 1000. Referring to FIG. 5B, the hold of a ship 1000 or other sea worthy vessel is shown generally in broken lines, and the disclosed system is assembled above and below deck. It should be noted, however, that the illustrations are merely illustrative and the entire system is capable of being positioned above or below the deck with any component of the system above or below deck.

Still referring to FIG. 5B, bilge water, black water, gray water, slops, or other oily waters (collectively "oily waters") may be collected for treatment within the system. Suitably, such oily waters can include but are not limited to vessel discharges, land based generated waste water, ocean based oil spills, water pumped to the system from vessels or trucks on the dock. Suitably, said oily waters can be accepted to the system at high discharge rates by shipboard pumps. In a preferred embodiment the ship 1000 may collect the oily waters via a receiving station that is hard piped or hoses with cam-lock and flange connections. In a preferred embodiment, brass or nylon parts and components are preferred to aluminum components. Suitably, the receiving station features a spill containment pan to catch spills during connect and disconnect operations. In one embodiment, a gas or diesel powered three or 4 inch semi-trash type three/fourths inch centrifugal pump is employed to accomplish collection of the oily waters, although a peristaltic pump or diaphragm pump could also be employed. Pumps may be suitably fitted with cam-locks to attach to the hoses and a four inch pump may be used for high volume split flow designs. Suitably, a water meter may be employed to monitor the volume of water being collected for operation and billing purposes. In a preferred embodiment, a badger model brass four inch meter is employed, but other meters that are approved by applicable jurisdictions can also be employed.

In a first step, the collected oily waters may be provided through a bag or screen filter 1100. Suitable bag filters 1100 are large in size and capable of accommodating high flowrates of oily waters passed therethrough. In the preferred embodiment, the bag or screen filter 1100 is intended to filter garbage, rags, rocks, and other large debris from the oily waters.

In a second step, the oily waters may be provided to a primary storage tank 1150 so that the oily waters may either settle into oil and water layers or be provided through an oil/water separator. Suitably, the primary storage tank 1150 contains multiple level sensor to gauge the water level, the oil level and sludge level within the tank 1150. The primary storage tank 1150 may further include multiple overfill sensors, lights and/or horns to signal a full tank 1150. In one embodiment, the primary storage tank 1150 employs drum skimmers (not represented in FIG. 5B) to remove the oil layer and transfer the oil to an oil storage tank 1250. In a preferred embodiment, the skimmer is a Weir type floating fiberglass or plastic skimmer (yellow) that is thirty six inches by twenty four inches. Suitably, such a skimmer is capable of skimming water at a flow rate of eighteen thousand gallons per hour. The water layer within the tank 1150 may be provided to one or more primary treatment tanks 1300. Preferably, the tank 1150 contains submersible pumps (not depicted in FIG. 5B) for transferring the water layer to the primary treatment tank(s) 1300.

In a third step, the water from the tank 1150 may be introduced to a water tank 1200 and then to one or more primary treatment tanks 1300 for flocculation and/or coagulation. In a preferred embodiment, the flocculation is a ballast enhanced proprietary multi-element (PME) flocculation system where the flocculation includes ballasting agents such as metal particles. Preferably, iron particles are used as the ballasting agent. Suitably, three primary treatment tanks are provided where: (a) water from the tank 1150 may be pumped through a FLOC blender in the first primary treatment tank 1300 where FLOC agents and/or coagulation agents are injected into the water stream; (b) the water and FLOC agent are provided to the second primary treatment tank 1300 to settle into a water layer and a layer of agglomeration and particulate wastes. Suitably, the second primary treatment tank 1300 may contain level indicators and overfill sensors. Ultimately, water from the primary treatment tank 1300 may be provided to a sand filter 1450 while agglomeration and particulate waste are provided to a filter press 1320.

From the primary treatment tanks 1300 water may be provided to a sand filter 1450. Suitably, the sand filter 1450 is fiberglass industrial type of large capacity and capable of handling high flow rates of water to be treated. In one embodiment, the sand filter is three (3x), two hundred and fifty gallon per minute sand filters in parallel capable of achieving a total flowrate of seven hundred and fifty gallons per minute. Although, it should be noted that the sand filters could be placed in series as well for lower flowrates (e.g., two hundred and fifty gallons per minute). Sand filtered water may be provided to the diatomaceous earth (DE) filter 1500. It should be noted that a portion of the sand filtered water (not shown) may be provided to the backwash or flush storage tank 1350 for recirculation into the primary storage tank.

As stated above, sand filtered water from the sand filter 1450 may optionally be provided to the DE filter 1500. In one embodiment, the DE filters are high flow rate DE filters plumbed in parallel. In a preferred embodiment, the DE filters are fiberglass, but steel DE filters would also be capable of being used in the disclosed system. It should be noted that a portion of the DE filtered water (not shown) may be provided to the backwash or flush storage tank 1350 for recirculation into the primary storage tank 1150.

From the DE filter 1500 or the sand filter 1450, water to be treated may be provided to the media tank 1550. Suitably, the media tank is five foot tall in-cage cylindrical tank and sized with a seven foot diameter. Suitably the tank 1550 is made of steel and coated with polyester on the inside and outside. In a preferred embodiment, the tank 1550 features three inch cam lock connections at various locations and one eleven inch by eighteen inch manhole in the top. Suitably, the tank 1550 may feature internal piping (laterals) made of polyvinyl chloride or stainless steel. Some embodiments of the tank 1550 have a pressure gauge and air vent on the top and a separate washout hole in the bottom. Suitably, the tank 1550 has an operating or working pressure of thirty pounds per square inch and a pressure relief valve set to forty-five pounds per square inch. In one embodiment, the tank 1550 is transportable and features one or both of (a) skid type mounts on its bottom for forklift pickup or (b) "D" rings attached by brackets to the cage (not welded to the tank's 1550 frame) for harness pickup. As discussed above, the media tank 1550 contains a polymer carbon mixture that is lifted by an air compressor connected to the tank. It should be noted that media tanks can be filled with sand and used as sand filters for large scale cleanup or for turbid water.

From the media tank 1550 treated water may be passed through a ultraviolet light ("UV") treatment system 1600 to purge or otherwise address biological materials from the treated water. Specifically, the UV treatment sterilizes invasive species and disinfects the water by sterilizes/kill germs, viruses, and bacteria. In one embodiment, the UV treatment system features an external and/or internal light source unit in order to minimize cleaning requirements. Other UV treatments with internal light sources could be used but are less preferable.

After UV treatment in the UV treatment system 1600, treated water may be provided to at least one storage tank 1650. Suitably, the storage tank(s) 1650 may be positioned, as shown, below the deck of the ship 1000. In a preferred embodiment, the tanks 1650 and the compartments housing the same are coated with polyester resin for corrosion protection. In a preferred embodiment, water may be discharged from the storage tank 1650 directly in to the ocean from the ship 1000. In one exemplar embodiment, discharge of water is accomplished via a three inch submersible pump that operates at four hundred and eighty volts of power and delivers five hundred gallons per minute of flow. Suitably, the storage tank(s) 1650 includes a liquid level gauge for each tank plus a visual and sound alarm for over flow protection. In some embodiments, visual inspection of the capacity of a tank 1650 may be accomplished via opening the hatch.

From the primary treatment tank 1300, agglomeration and particulate waste may be provided to a filter press 1320. Suitably, the filter press 1320 serves to de-water sludge. Suitably, water pressed from the sludge may be provided to the backwash or flush storage tank 1350 for recirculation into the primary storage tank 1150. Preferably, the backwash or flush storage tank 1350 is a two to three thousand gallon polymer tank that is (a) light color so that fluid levels can be observed through the sidewalls of the tank and (b) light weight so that the tank can be transported easily. In a preferred embodiment, the backwash or flush tank 1350 is anchored to the vessel 1000 above or below the deck. Pressed sludge or filter cake may be collected in a bin 1400 for disposal and or destruction.

Still referring to FIG. 5B, it is contemplated that the system shown may be removably assembled on a ship 1000 or permanently installed on the ship. In the system piping, including connections and tank transfers are done with polyvinyl chloride and rubber hoses. Three inch polyvinyl chloride hoses are preferred, where the hoses have: a helix to allow for suction; and, cam lock connections with two stainless bands. Preferably, the hoses are provided in twenty five or fifty foot sections with a working pressure of seventy five pounds per square inch. In one embodiment the piping and hoses are three inch in diameter with cam lock fittings that are preferably brass or nylon rather than aluminum. In removably assembled systems, the piping between system components is preferably located on the ship's 1000 deck rather than internally to the ship 1000. Furthermore, piping should include pressure relief valves, where appropriate, to eliminate hose or piping failures. Finally, pumping between components in the system can be done with submersible three inch pumps that operate with 480, 660, or 880 volts of power or with a 220/3 phase voltage.

Figure 6:
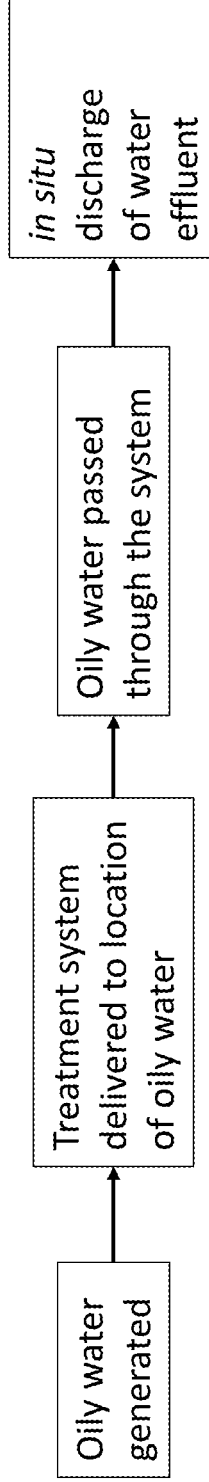
FIG. 6 is a process flow diagram for generally illustrating the cleanup of oily waters via the disclosed system of oily water treatment shown in FIGS. 5A and 5B.

FIG. 6 is a generalized flow diagram of a preferable mode of operation for the disclosed system that is applicable to land, freshwater, and ocean treatment of oily waters. As shown, oily water may be generated at a remote location. Suitably, a treatment system may be delivered to the location of the oily water. Oily water may be treated on location by passing the same through the delivered system. Finally treated water may be discharged on-location at the point of treatment into the environment.

Figure 7:
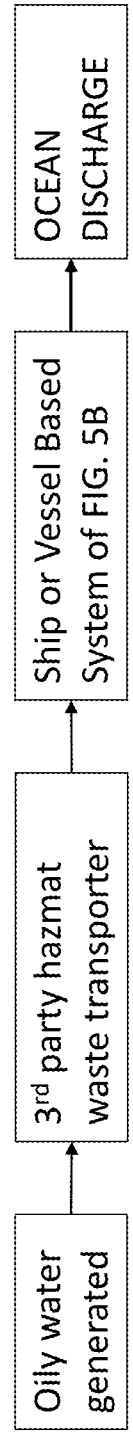
FIG. 7 is a process flow diagram for the cleanup of oily waters generated on land at accessible locations via the disclosed system of oily water treatment.

FIG. 7 is a process flow diagram for the typical cleanup of oily waters generated on land at accessible locations. First, oily water is generated, e.g., by leaking machinery. Second, a hazmat waste transporter collects the oily water and transports the waste to a port or ship yard with a ship 1000 shown in FIG. 5B. Third, the waste is treated by the treatment system aboard the ship 1000. Finally, the treated water is discharged to the ocean. The system of FIG. 7 contrasts with prior art systems shown in FIG. 1.

Figure 2:
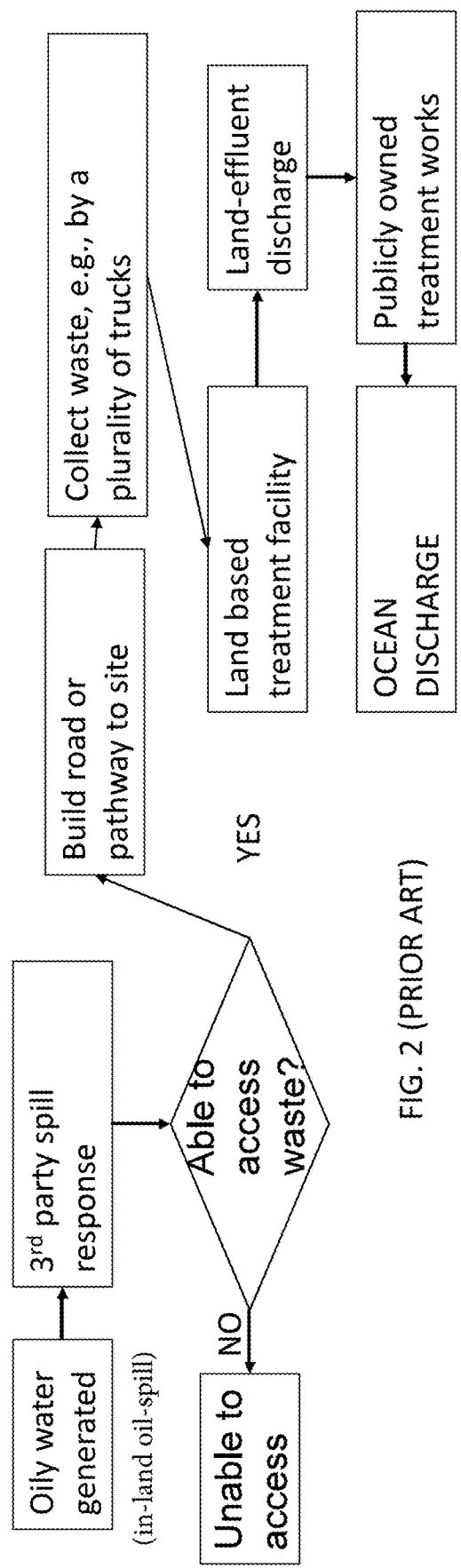
FIG. 2 is a process flow diagram for the typical cleanup of oily waters generated on land at inland waterways (e.g., lakes, streams, wetlands) or other inaccessible locations.
Figure 8:
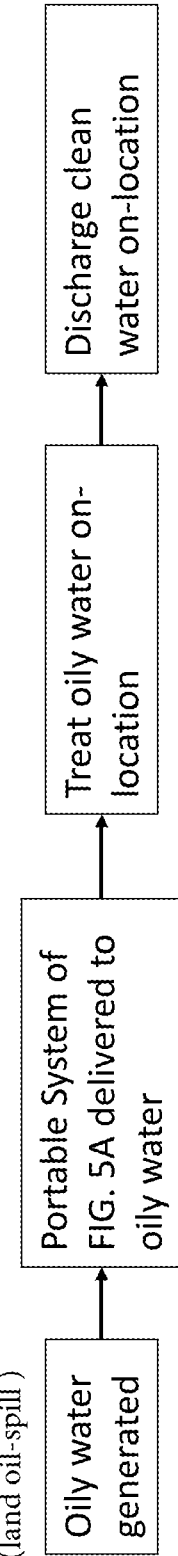
FIG. 8 is a process flow diagram for the typical cleanup of oily waters generated on land at inland waterways (e.g., lakes, streams, wetlands) or other inaccessible locations via the disclosed system of oily water treatment.

FIG. 8 is a process flow diagram for the typical cleanup of oily waters generated on land at inland waterways (e.g., lakes, streams, wetlands) or other inaccessible locations via the disclosed system. First, oily water is generated, e.g., by oil spill. Second, a portable treatment system disclosed in connection with FIG. 5A may be delivered to the oily water. For instance, the system may be delivered as a kit for setup on site, delivered preassembled on a truck trailer, or delivered by helicopter. Third, the oily water may be treated by the delivered treatment system. Finally, the treated effluent is discharged to the source. The system of FIG. 8 contrasts with prior art systems shown in FIG. 2.

Example 1—10,000 GALLON INLAND OIL SPILL ABOVE A SNOW COVERED LAKE: In one example, gasoline and diesel fuel pipelines may break above a mountain lake with ten feet of snow on the ground wherein 10,000,000 gallons of oily water may be created by the oil spill inland at this remote geographic location. The snow makes it difficult to recover the oily water due to coverage and difficulty locating spill accumulation areas. A creek may be contaminated that feeds the lake at 2500 gallons per minute and the flow of the creek is expected to increase to 10,000 or more gallons per minute as the snow melts. In some cases, the oily water is diluted to a high degree and is difficult to locate without lab testing. In other cases, free product is encountered with almost no dilution by water. Both cases of high dilution and free product cannot be handled in a typical cleanup scenario.

A third-party response company may or may not be able to collect the oily water from the geographic location. Sometimes, bags of carbon can be used to treat the lake and sorbent pads can be used to remove oil sheen from the lake.

In some cases, the third-party response company can clear roads to the geographic location and collect the oily water with VAC trucks (e.g., 20 VAC trucks) which can collect up to 5,000 gallons of water each. But, VAC trucks require a road to access the spill and if the geographic location is inaccessible, then roads would need to be constructed or cleared. After collection by VAC truck, the water may be hauled by the third party response company to a treatment facility where the water is treated and discharged to the sewer or other publicly owned treatment work. The haul distance can exceed 500 miles in some cases.

In a treatment process that is typical of the present disclosure, the entire creek may be treated for four months. A coffer dam may be constructed to prevent the creek from flowing into the lake (e.g., constructed at a narrow choke point of the creek). In one instance, the creek may be treated using twelve portable systems that are flown in to the area so that 3,000 gallons per minute can be treated. The portable systems may be delivered by truck or helicopter depending on accessibility. Suitably, the contaminants of the creek may be removed to less than one part oil per billion parts of water ("one part per billion of oil") so that the treated water may be discharged directly back into the creek.

Figure 3:
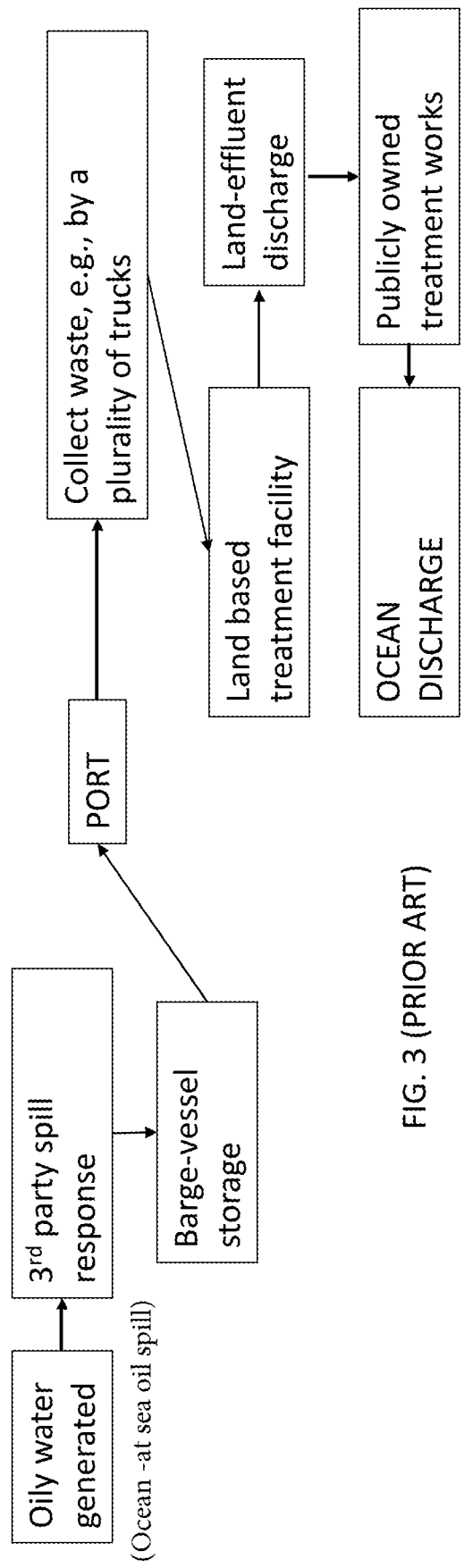
FIG. 3 is a process flow diagram for the typical cleanup of oily waters generated at sea or open ocean.
Figure 9:
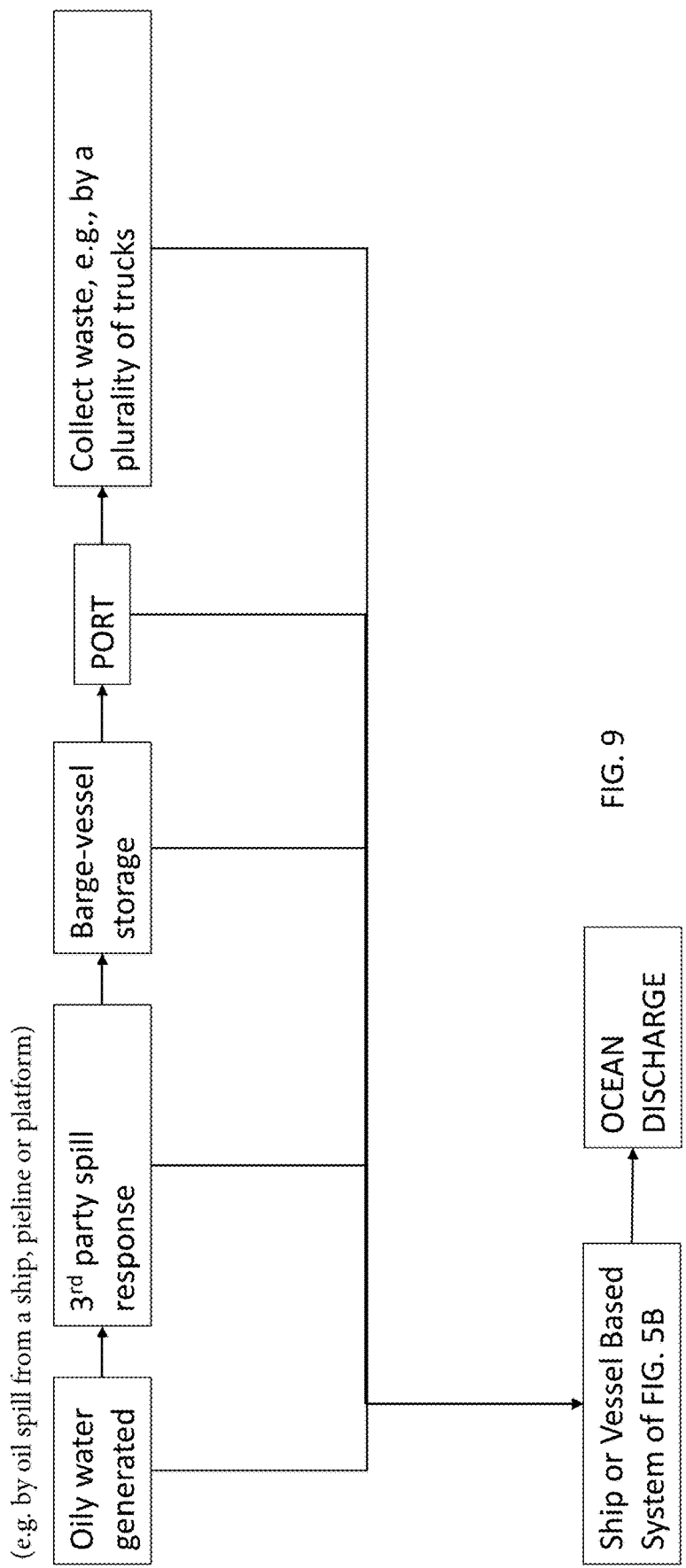
FIG. 9 is a process flow diagram for the typical cleanup of oily waters generated at sea or open ocean via the disclosed system of oily water treatment.

FIG. 9 is a process flow diagram for the typical cleanup of oily waters generated at sea or open ocean. First, oily water is generated, e.g., by oil spill from a ship, pipeline or platform. From the creation of oily waters several possible methodologies can proceed for treating the oily water. In one embodiment, the oily water is generated on a vessel that possesses the disclosed system of FIG. 5B. In that scenario, the water is immediately treated by the system and discharged to the ocean. In another method, a third party collects the oily water and it is provided to a vessel that possesses the system of FIG. 5B for water treatment. In yet another scenario, a spill response team collects the oily water onto the storage tanks of a barge or vessel whereafter the oily water is transferred to a vessel that possesses the system of FIG. 5B for water treatment. Alternatively, the spill response team could return to port before providing the oily water to a vessel possessing the system disclosed in FIG. 5B. In yet another alternative, a hazmat waste transporter collects the oily water, e.g., via a plurality of trucks, at port and transports the waste to a vessel possessing the system disclosed in FIG. 5B. In any event, the treated water is discharged directly to the ocean. The system of FIG. 9 contrasts with prior art systems shown in FIG. 3.

Example 2—100,000 GALLON OIL SPILL AT SEA: in one example, 100,000 gallons of oil may be spill at sea to create 10,000,000-100,000,000 gallons of oily water. Booms may be placed around the spill to corral (contain) the oil so that skimmer removal is more efficient.

A third-party response company may or may not be able to collect the oily water from the at sea location. Typically, the third-party response company would place booms around the spilled to corral (contain) the oil so that skimmer removal is more efficient. Yet still, skimming of the spill would take 240-1440 hours with 2 to 6 skimmers at a rate of 50-150 gallons per hour at 10-50% oil-volume recovery. None of the dissolved oil in the oily water would be recovered by the skimmers. Any water collected is hauled to port and passed to VAC trucks for haul and delivery to treatment facilities. VAC trucks (e.g., 10-14 trucks) can only carry 4,000-5,000 gallons per load to the waste facility. This process is time consuming. For instance: VAC truck loading times are 3-5 hours each with 2-4 trucks used in rotation for transport, the transport time is 2-4 hours per load, waiting time at the treatment facility is 1-2 hours, truck unloading time is 1-2 hours, and VAC truck cleaning time is 4-8 hours. Time costs are 74-190 hours of occupied dock space and 28-81 hours of treatment use for just 5,000 gallons of recovered water. Once treated, the water may be passed via piping to publicly owned water treatment works via sewer lines.

In a treatment process that is typical of the present disclosure, booms may still be placed to corral the oil but no skimming takes place. Instead, water is taken up into a treatment vessel, and oil is removed and discharged at the site of collection at less than one part per billion. In one instance, one or more vessels are used for treatment and discharge of the oily water at a vacuum rate of 10,000 gallons per minute. Oil volume is recovered at 90% and dissolved oil is captured with a total time of 168-200 hours. No dock time is needed and no VAC trucks are used. In the system of the present disclosure, water can be treated at 14 million gallons per day (or more) to produce cleaner discharge than the publicly owned water treatment works. It should be noted that publicly owned treatment works treat water to standards of parts per million of oil and the disclosed system treats water to standards of parts per billion of oil.

Figure 4:
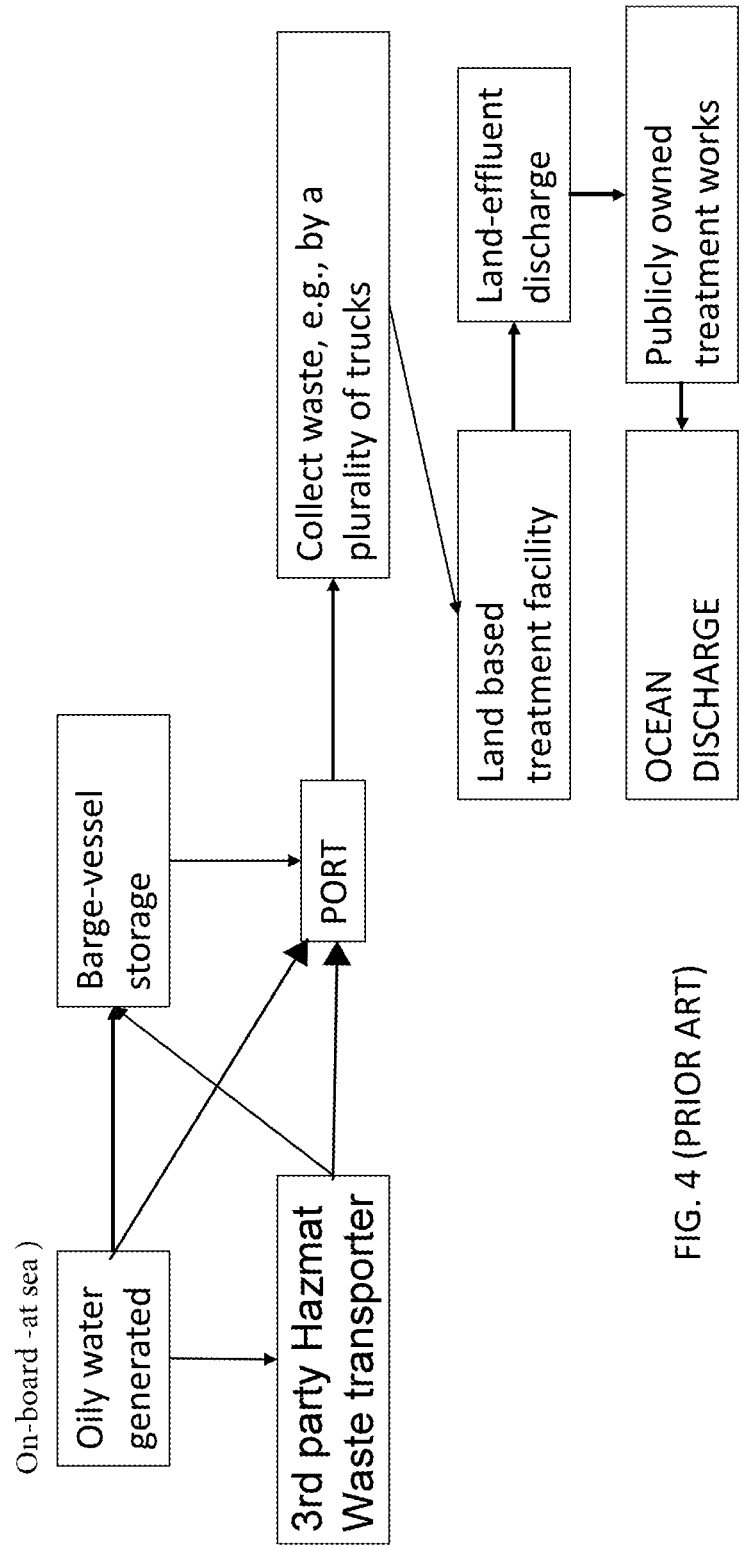
FIG. 4 is a process flow diagram for the typical cleanup of oily waters generated at sea or open ocean.
Figure 10:
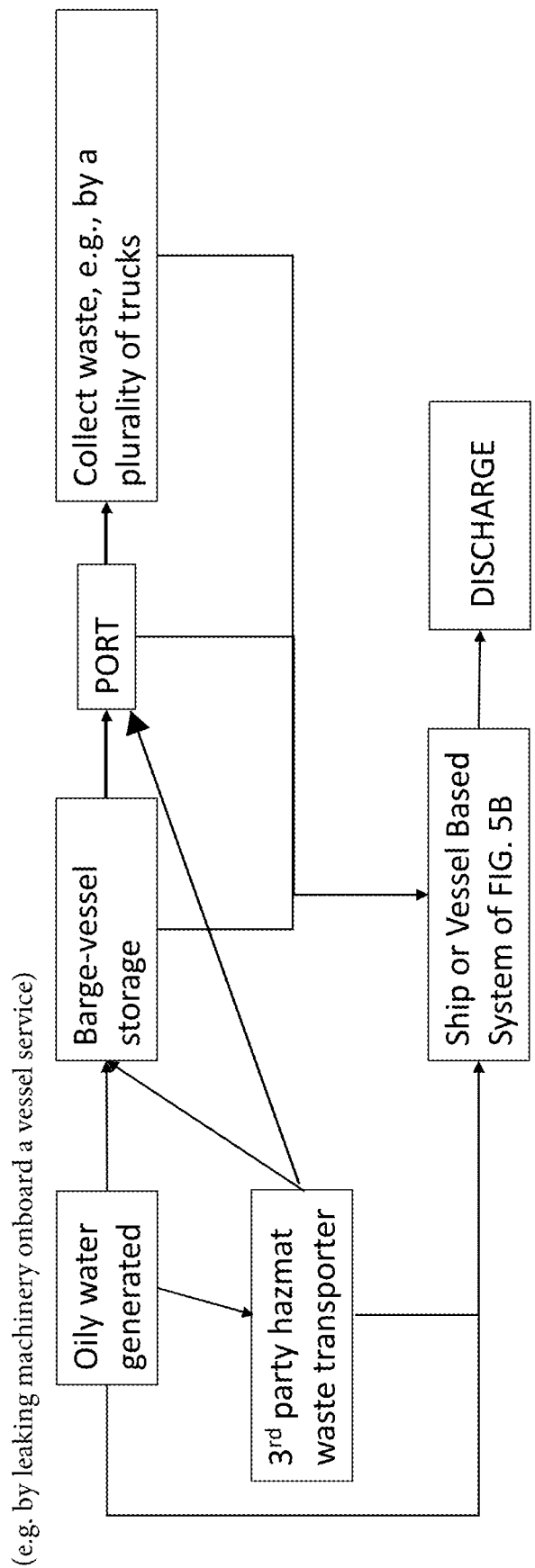
FIG. 10 is a process flow diagram for the typical cleanup of oily waters generated at sea or open ocean via the disclosed system of oily water treatment.

FIG. 10 is a process flow diagram for the typical cleanup of oily waters generated at sea or open ocean. First, oily water is generated, e.g., by leaking machinery on board a vessel service (e.g., bilge water, slop water, ballast water, gray water, FOG water (fats, oils, greases)). Second, a spill response team collects the oily water from the generating vessel and either treats the water according to the system disclosed in FIG. 5B or loads the same onto the storage tanks of a second barge or vessel for transport to a vessel with the system according to FIG. 5B. Alternatively, the oily water may be collected and stored on board the waste generating vessel and delivered to a second vessel possessing the water treatment system of FIG. 5B. An intermediate step could involve the barge or vessel containing the waste being returned to port before the oily water is provided to a treatment vessel of FIG. 5B. In another methodology, a hazmat waste transporter may collect the oily water, e.g., via a plurality of trucks, and transport the waste to a different treatment vessel of FIG. 5B. In any event, the treated water is discharged to the ocean. The system of FIG. 10 contrasts with prior art systems shown in FIG. 4.

EXAMPLE 3-50,000 GALLONS OF OILY WATER ON BOARD (SLOPS): In one example, an ordinary vessel may have 50,000 gallons of oily water/slops onboard. In one mode of treatment, a barge is dispatched to a ship (travel time 2-4 hours) where the slops are offloaded at 50-500 gallons per minute (4-16 hours total time) and after which, the barge is returned to dock (2-4 hours travel time). Delays are common due to dock availability. From here, the barge may unload the slops to VAC trucks as described above. In a treatment process that is typical of the present disclosure, a barge of the disclosed system may be dispatched to the ship where the oily waters may be offloaded and discharged directly to the ocean.

Figure 11:
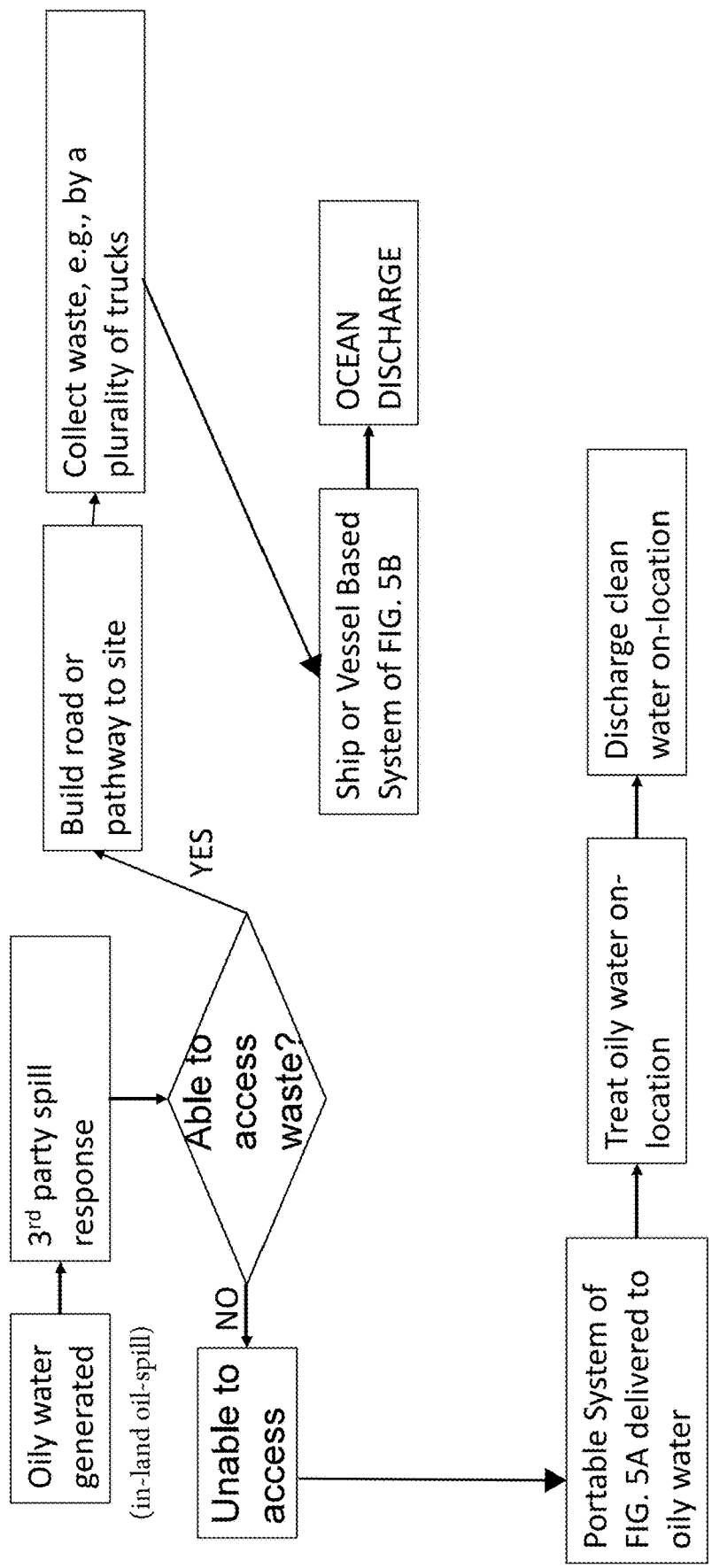
FIG. 11 is a process flow diagram for the cleanup of oily waters initially by a third party hazmat waste transporter and, FIG. 12 is a diagram for (a) changing a vessel's bilge and/or other waste waters to ballast water via the disclosed system of oily water treatment and (b) simultaneously providing waste water treatment and/or collection services and fueling services to a single vessel.

FIG. 11 is a process flow diagram for the cleanup of oily waters initially by a third party hazmat waste transporter. First, oily water is generated, e.g., by oil spill. Second, a spill response team assesses whether the waste can be accessed and IF NOT a portable system described in connection with FIG. 5A is provided, the oily water is treated and discharged on-location or ELSE roads or other pathways are built to the oily water. Third, a hazmat waste transporter collects the oily water, e.g., via a plurality of trucks, and transports the waste to a ship or vessel based treatment facility described in connection with FIG. 5B and discharged to the ocean.

Figure 12:
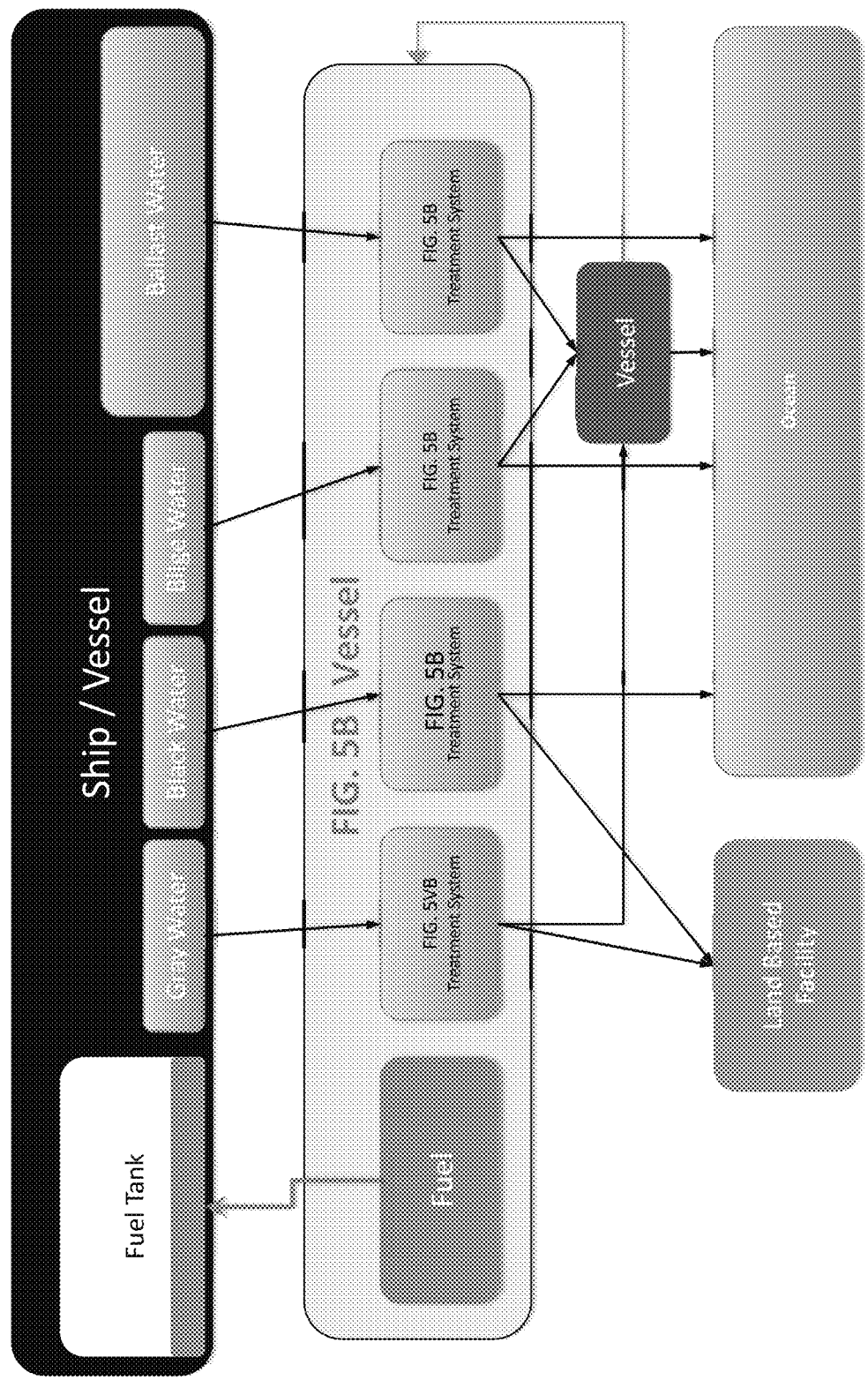

FIG. 12 is a diagram for (a) changing a vessel's bilge and/or other waste waters to ballast water via the disclosed system of oily water treatment and (b) simultaneously providing waste water treatment and/or collection services and fueling services to a single vessel. As shown in the figure, a ship/vessel with low fuel and containing gray water, black water, bilge water, or foreign ballast water may be desirous of refueling and responsibly discharging its waste waters. In a typical prior art scenario (not shown in FIG. 12), both (a) a third party hazmat transporter is required (as described in FIG. 1, 3 or 4) to collect the waste and deliver the same to a land based treatment facility and (b) a third party fueling service must be hired for refueling the ship or vessel. The prior art scenario (not shown in FIG. 12) is time consuming because the third-party hazmat services and third-party refueling services do not simultaneously connect to the ship or vessel because such simultaneous connection is logistically improbable. In other words, the hazmat and refueling services must be accomplished in series rather than in parallel. Also, in the prior art scenario (not shown in FIG. 12) foreign ballast water cannot be dumped within 200 miles of shore, so, the foreign ballast water must either also be collected by the third party hazmat transporter or taken out to the open ocean before the ballast can be filled with fresh local waters. The disclosed system addresses these prior art scenarios. Referring again to FIG. 12, a ship or vessel based system (as set forth in FIG. 5B) of the present disclosure may further include a fuel tank for refueling the vessel so that the vessel may be refueled simultaneously while the waste waters are collected for treatment. As discussed, the waters may be treated onboard (see FIG. 5B) and then discharged at a land based facility or directly in to the ocean. In an alternative scenario, also depicted in FIG. 12, gray water, bilge water and foreign ballast water may be treated and either (i) returned to the origin vessel (or any other vessel) as clean ballast water without the need for an intermediate step of loading local ballast water or (ii) taken aboard a ship or vessel system (as set forth in FIG. 5B) for treatment while local waters are used to replenish the ballast water of the ship or vessel.

Although the method and apparatus is described above in terms of various exemplary embodiments and implementations, it should be understood that the various features, aspects and functionality described in one or ore of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

PAPER "SEQUENCE LISTING"

Not applicable.

I claim:

1. A ship or sea-worthy vessel 1000 with a system for cleaning oily water, where the system comprises:

a receiving station that comprises a spill containment pan, wherein the receiving station is connected via pipe or hose to a centrifugal pump so that movement of an amount of oily water is accomplished through the receiving station after the centrifugal pump has been connected to an onboard or offboard source of the oily water;

a water meter wherein the water meter measures the amount of oily water;

a bag filter 1100 coupled to said receiving station so that debris is filtered from said amount of oily water, wherein said large debris are selected from the group of consisting of garbage, rag, rock;

a primary storage tank 1150 wherein said amount of oily water is either (a) settled into an oil stream and a water stream or (b) provided through an oil/water separator to create the oil stream and the water stream;

an oil storage tank 1250 coupled to the primary storage tank 1150, wherein the oil storage tank 1250 collects and retains the oil stream after said oil stream has either been (a) removed from the primary storage tank by at least one oil skimmer/drum or (b) separated from the water stream by the oil/water separator;

a water tank 1200 coupled to the primary storage tank 1150, wherein the water tank 1200 receives the water stream from the primary storage tank 1150 after said oil stream has either been (a) removed from the primary storage tank by at least one oil skimmer/drum or (b) separated from the water stream by the oil/water separator;

a submersible pump that transfers a water layer from tank 1150 to at least three primary treatment tanks 1300 wherein (a) the water stream is received from the water tank 1150, through water tank 1200, and pumped through a FLOC blender in a first primary treatment tank 1300 where FLOC agents, coagulation agents, and metal particles are injected into the water stream, (b) the water stream, FLOC agents, coagulation agents, and metal particles are provided to the second primary treatment tank 1300 to settle into a water layer and a layer of agglomeration and particulate wastes, and (c) where the water layer from the second primary treatment tank 1300 is provided to a third primary treatment tank while agglomeration and particulate waste are provided as sludge to a filter press 1320, wherein the filter press 1320 de-waters the sludge to create pressed water and pressed sludge, wherein the pressed sludge is provided to a bin 1400 for disposal or destruction, and wherein the pressed water is provided to a flush storage tank 1350 and recirculated into the primary storage tank 1150 to become a part of the water stream disposed in the primary storage tank 1150;

a sand filter 1450, wherein the water layer from the third primary treatment tank is passed through the sand filter 1450 to create a first and a second portion of sand filtered water, wherein the first portion of the sand filtered water is provided to a flush storage tank 1350 and recirculated into the primary storage tank 1150 to become a part of the water stream disposed in the primary storage tank 1150;

a diatomaceous earth (DE) filter 1500, where the second portion of the sand filtered water from the sand filter 1450 is passed through the DE filter to create a first and a second portion of DE filtered water wherein the first portion of the DE filtered water is provided to a flush storage tank 1350 and recirculated into the primary storage tank 1150 to become a part of the water stream disposed in the primary storage tank 1150;

a media tank 1550, where the media tank 1550 receives the second portion of DE filtered water wherein the DE filtered water is exposed to a polymer bond media mixture to create a treated water;

an ultraviolet light ("UV") treatment system 1600 wherein the treated water is provided to the UV treatment system where the treated water is exposed to UV light to create sterilized water, at least one storage tank 1650 for collecting the sterilized water from the UV treatment system; and, a submersible pump located in the at least one storage tank 1650 that discharges the sterilized water directly into a water body or ocean from the ship or sea-worthy vessel 1000.

2. The apparatus of claim 1 wherein the system is either removably assembled on a ship 1000 or permanently installed on the ship 1000.

3. The apparatus of claim 2 wherein system piping, including connections and tank transfers comprises polyvinyl chloride and rubber hoses.

4. The apparatus of claim 3 wherein the media tank 1550 is a five foot tall cylindrical tank and sized with a seven foot diameter.

5. The apparatus of claim 4 were the tank 1550 is made of steel or fiber glass and coated with polyester on the inside and outside.

6. The apparatus of claim 5 wherein, the tank 1550 comprises three inch cam lock connections at various locations and one eleven inch by eighteen inch manhole in the top.

7. The apparatus of claim 6 wherein the polymer bond media mixture in media tank 1550 contains a polymer bond media mixture comprising at least one polymer mixed with activated carbon, wherein the polymer bond media mixture is lifted by an air compressor connected to the media tank 1550.

* * * * *